US011129167B2

(12) United States Patent
Bengtsson et al.

(10) Patent No.: US 11,129,167 B2
(45) Date of Patent: Sep. 21, 2021

(54) CALIBRATING AN ARRAY ANTENNA

(71) Applicant: Sony Group Corporation, Tokyo (JP)

(72) Inventors: Erik Bengtsson, Eslöv (SE); Fredrik Rusek, Eslöv (SE); Zuleita Ho, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/053,307

(22) PCT Filed: Apr. 29, 2019

(86) PCT No.: PCT/EP2019/060939
§ 371 (c)(1),
(2) Date: Nov. 5, 2020

(87) PCT Pub. No.: WO2019/214984
PCT Pub. Date: Nov. 14, 2019

(65) Prior Publication Data
US 2021/0076370 A1 Mar. 11, 2021

(30) Foreign Application Priority Data
May 9, 2018 (SE) .................................... 1830153-1

(51) Int. Cl.
*H04W 72/04* (2009.01)
*H04B 17/12* (2015.01)
(Continued)

(52) U.S. Cl.
CPC ........ *H04W 72/048* (2013.01); *H04B 7/0617* (2013.01); *H04B 17/12* (2015.01);
(Continued)

(58) Field of Classification Search
CPC ........ H04B 17/12; H04B 17/13; H04B 17/11; H04B 17/21; H04W 72/0413; H04W 72/042; H04W 72/046
See application file for complete search history.

(56) References Cited

U.S. PATENT DOCUMENTS

| 8,891,598 B1 | 11/2014 | Wang et al. | |
|---|---|---|---|
| 2007/0099670 A1* | 5/2007 | Naguib | H04B 17/24 455/562.1 |

(Continued)

OTHER PUBLICATIONS

"International Search Report and Written Opinion of the International Searching Authority", International Application No. PCT/EP2019/060939, dated Jul. 2, 2019, 14 pp.

(Continued)

*Primary Examiner* — Kevin Kim
(74) *Attorney, Agent, or Firm* — Myers Bigel, P.A.

(57) ABSTRACT

The present application relates to methods for calibrating an array antenna (301) of a terminal (300) in a MIMO communication system (100). The method comprises: communicating, to a base station (200) of the MIMO communication system (100), a calibration capability indication from the terminal (300) indicative of a capability of the terminal (300) of calibrating receivers and transmitters for beam correspondence; communicating, from the base station (200) of the MIMO communication system (100) to the terminal (300), a control message indicative of radio resources; using the radio resources: calibrating receivers and transmitters of the terminal (300) for beam correspondence by performing over-the-air measurements of mutual coupling between antennas (310-312) of the array antenna (301).

21 Claims, 4 Drawing Sheets

(51) Int. Cl.
*H04B 7/06* (2006.01)
*H04W 72/08* (2009.01)

(52) U.S. Cl.
CPC ....... *H04W 72/042* (2013.01); *H04W 72/046* (2013.01); *H04W 72/0413* (2013.01); *H04W 72/085* (2013.01)

(56) References Cited

U.S. PATENT DOCUMENTS

| | | |
|---|---|---|
| 2009/0323783 A1 | 12/2009 | Buris et al. |
| 2017/0324486 A1* | 11/2017 | Garcia ................ H04B 17/102 |
| 2018/0070363 A1 | 3/2018 | Chakraborty et al. |
| 2018/0102827 A1 | 4/2018 | Noh et al. |
| 2020/0052753 A1* | 2/2020 | Raghavan .............. H04B 17/14 |
| 2020/0137607 A1* | 4/2020 | Akkarakaran ...... H04W 56/009 |

OTHER PUBLICATIONS

Mitsubishi Electric, "Discussion on antenna calibration in TDD", 3GPP TSG RAN WG1 #56 meeting (R1-090563), Athens, Greece, Feb. 9-13, 2009, 4 pp.

Qualcomm Incorporated, "Beam Reciprocity Aspects", 3GPP TSG RAN WG1 Meeting #87 (R1-1612058), Reno, Nevada, USA, Nov. 14-18, 2016, 11 pp.

\* cited by examiner

CALIBRATING AN ARRAY ANTENNA

CROSS REFERENCCE TO RELATED APPLICATIONS

This application is a 35 U.S.C. § 371 national stage application of PCT International Application No. PCT/EP2019/060939, filed on Apr. 29, 2019, which itself claims the benefit of and priority to Swedish Application No. 1830153-1, filed on May 9, 2018, the contents of both of which are incorporated herein by reference in their entirety. The above-referenced PCT International Application was published in the English language as International Publication No. WO 2019/214984 A1 on Nov. 14, 2019.

FIELD OF THE INVENTION

Various embodiments of the present invention relate to methods for calibrating an array antenna of a terminal in a multiple input and multiple output (MIMO) wireless communication system. Various embodiments of the present invention relate furthermore to terminals and base stations supporting the methods.

BACKGROUND OF THE INVENTION

Increasing use of mobile voice and data communications may require a more efficient utilisation of the available radio frequency resources. For increasing data transmission performance and reliability, a technology known as multiple input and multiple output (MIMO) technology may be used in wireless radio telecommunication systems for transmitting information between the devices, for example between a base station and a terminal, for example a user equipment. The terminal may comprise mobile devices like mobile phones, mobile computers, tablet computers or wearable devices, and stationary devices like personal computers or cash registers. In systems using MIMO technologies the devices may use multiple send and receive antennas. For example, the base station as well as the terminal may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to transmit and focus radiation to multiple receivers in three dimensions. Such technologies may also be of significance for mmWave and New Radio (NR) 5G wireless communication. For example, a base station may comprise a large number of active antenna elements in a two-dimensional grid and the use of the FDMIMO technology enables a support of many spatially separated user terminals on the same time/frequency resource blocks simultaneously. This may reduce interference from overlapping transmissions to other terminal receivers and increases the received power of the signal at the terminal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving terminal, a base station logic may need information about radio channel properties between the terminal and the antennas of the base station. Vice versa, in order to adapt the transmit signal at each individual antenna of the terminal, a terminal logic may need information about the radio channel properties between the base station and the antennas of the terminal. For this purpose, a channel sounding may be performed to determine the radio channel properties between the terminal and the base station. The channel sounding may comprise transmitting predefined pilot signals which may allow the base station and the terminal to set their configuration antenna parameters for transmitting signals so as to focus radio energy or for receiving radio signals from a certain direction.

The large number of antennas of MIMO devices, for example a base station or a terminal, allows radio energy to be spatially focused in transmissions forming transmit beams, as well as a directional sensitive reception forming receive beams. A transmission between MIMO devices may be established by a beam sweeping procedure. For example, a base station may sweep its transmit beams thus subsequently covering a plurality of spatial sectors. For each transmit beam from the base station, a terminal may sweep its receive beams for determining an appropriate pair of base station transmit beam and terminal receive beam for a communication between the base station and the terminal. A downlink communication from the base station to the terminal may be established based on the determined pair of base station transmit beam and terminal receive beam.

For the uplink communication from the terminal to the base station, a corresponding pair of a base station receive beam and terminal transmit beam may be utilised. In particular in time division duplexing (TDD) systems, the radio channel between the antennas of the terminal and the antennas of the base station may be assumed to provide reciprocal characteristics in the uplink and the downlink direction. Therefore, for example, for gaining the base station receive beam, a receiver configuration at the base station may be determined based on reciprocity of a transmitter configuration at the base station for the base station transmit beam. Likewise, for gaining the terminal transmit beam, a transmitter configuration at the terminal may be determined based on reciprocity of a receiver configuration at the terminal for the terminal receive beam. However, this requires beam correspondence of the receive beam and the transmit beam at the base station, as well as beam correspondence of the receive beam and the transmit beam at the terminal. Further, the beams may be associated with codebook entries and, as such, needs to be accurate.

The antennas may be associated with individual receiver hardware comprising analogy circuitry (receiver) and transmit hardware comprising further analog circuitry (transmitter). Receive characteristics of a receiver associated to an antenna may differ from the transmit characteristics of a transmitter associated to that antenna such that beam correspondence based on reciprocity in the receiver and transmitter may not be given.

Several methods for achieving and enhancing beam correspondence are known in the art, as discussed for example in R4-1801637 and R4-1801798 of 3GPP TSG RAN WG4 #86 meeting (Athens, Greece, 26 Feb.-2 Mar. 2018). The paper "Reciprocity Calibration for Massive MIMO: Proposal, Modeling and Validation" by Joao Vieira, Fredrik Rusek, Ove Edfors, Steffen Malkowsky, Liang Liu, Fredrik Tufvesson (Submitted to IEEE Transactions on Wireless Communications, 21 Feb. 2017 and cited as arXiv: 1606.05156) presents a mutual coupling based calibration method for time-division-duplex massive MIMO systems, which enables downlink precoding based on uplink channel estimates. The entire calibration procedure is carried out solely at the device that needs to be calibrated (for example a base station, BS) by sounding all antenna pairs. An Expectation-Maximization (EM) algorithm is derived, which processes the measured channels in order to estimate calibration coefficients.

However, in particular terminals, for example mobile phones, may suffer from receivers and transmitters which do not provide reciprocity in receive and transmit directions due to cost-efficient hardware, temperature and humidity drift, and/or frequency dependent characteristics of the receivers and transmitters.

SUMMARY OF THE INVENTION

In view of the above, there is a need in the art for methods and devices which address at least some of the above shortcomings of conventional MIMO systems. In particular, there is a need in the art for improving beam correspondence of terminals in a wireless communication systems.

According to the present invention, this object is achieved by the features of the independent claims. The dependent claims define embodiments of the invention.

According to the present invention, a method for calibrating an array antenna of a terminal in a multiple input multiple output (MIMO) communication system is provided. The terminal may comprise a mobile user equipment, for example a mobile telephone, a mobile computer, a tablet computer, a wearable device or a mobile accessory. A wearable device or a mobile accessory may comprise a wearable computer, also known as body born computer or simply wearable, which is a miniature electronic device that may be worn by a user under, with or on top of clothing. According to the method, a calibration capability indication is communicated from the terminal to a base station of the MIMO communication system indicative of a capability of the terminal of calibrating receivers and transmitters for beam correspondence. Further, a control message indicative of radio resources is communicated from the base station of the MIMO communication system to the terminal. The control message is indicative of radio resources to be used by the terminal for calibrating its receivers and transmitters for beam correspondence. Using the radio resources, receivers and transmitters of the terminal are calibrated for beam correspondence by performing over-the-air measurements of mutual coupling between antennas of the array antenna. Calibration coefficients of the antennas of the array antenna of the terminal may be determined based on the over-the-air measurements.

Thus, the base station provides radio resources which are used by the terminal to calibrate its receivers and transmitters such that beam correspondence at the terminal may be achieved. As the base station controls providing the radio resources, the terminal may perform the calibration without disturbing other communications within the MIMO communication system.

The radio resources may comprise radio resources spread out over a frequency band assigned to communications between the base station and terminals in the MIMO communication system. In particular, the radio resources may comprise a time resource, a frequency resource, or a time-frequency resource defined for payload and control communications in the MIMO communication system.

The radio resources may be reserved. Hence, the terminal may have preferred access to the radio resources. For example, other devices may be blocked from accessing the radio resources.

Further, the radio resources may comprise in-band radio resources intended to a communication between the base station and the terminal in the MIMO communication system.

According to an example, the radio resources are selected based on a coherence bandwidth of hardware circuitry of the array antenna. Thus, beam correspondence of the required coherence bandwidth may be calibrated by performing over-the-air measurements over the coherence bandwidth of mutual coupling between antennas of the array antenna.

According to another example, the over-the-air measurements may be performed on different frequencies in different time instances or all at the same time. For example, within each frequency and time coherence interval radio resources for calibration may be provided. The time coherence may be in the order 10 s or more and may be triggered by either the terminal or the base station or a timer, while for each calibration for all frequency coherence intervals radio resource may be provided.

According to further examples, the control message indicative of radio resources is associated with the calibration capability indication. For example, when the terminal registers at the base station, the terminal may indicate its calibration capabilities, and in response to this indication, the base station may transmit a control message indicating radio resources which may be used by the terminal for calibrating its receiver and transmitter hardware.

For example, the calibration capability indication may indicate a number of antennas of the array antenna and/or a number of resources needed for sounding the antennas of the array antenna. Based on this information, the base station may determine the amount of the resources required for determining the calibration coefficients at the terminal. For example, the base station may allocate a number of resources which corresponds to the number of antennas of the array antenna of the terminal or as requested by the terminal. In the control message, the base station may indicate these allocated resources.

The number of resources may be a predefined value, for example a same value for any terminal. In this case, the calibration capability indication may only indicate that the terminal has the capability for calibrating its receiver and transmitter hardware based on the predefined number of resources.

Further, a predefined set of numbers of resources may be provided, for example an enumeration type. The calibration capability indication may indicate which number of resources from the predefined set of numbers of resources are needed by the terminal for calibrating its receiver and transmitter hardware based on the predefined number of resources According to another example of the method, a calibration request indication may be communicated from the terminal to the base station requesting radio resources. Thus, the calibration of the coefficients may be triggered by the terminal, for example based on measurements or events in the terminal. As a general rule, calibration of the coefficients may include communicating the control message indicative of the radio resources, performing the over-the-air measurements, and determining the calibration coefficients. For example, the message indicative of the radio resources may be communicated during a registering process when the terminal is registering at the base station.

For example, calibration of the array antenna may be repeatedly triggered in accordance with a coherence time of hardware circuitry of the array antenna. The coherence time of the hardware circuitry of the array antenna may be predefined or determined in the terminal. For example, the terminal may monitor conditions of the terminal which may influence the coherence time, for example temperature, moisture level or a movement of the terminal. As an example, a terminal lying on a desk indoor may have coherence times of days, while an outdoor terminal in some tropical country may have a coherence times of some minutes only. Movement of the terminal may cause the terminal to use a different antenna panel having a different coherence time and requiring a calibration to be triggered. Calibrating the array antenna may be triggered based on these conditions by the terminal or by the base station, for example based on the coherence time communicated from the terminal to the base station.

According to a further example, the over-the-air measurements comprise performing subsequently for each antenna of the plurality of antennas: transmitting a radio signal via the antenna using radio resources, and receiving the radio signal at at least some antennas of the plurality of antennas. Based on the received radio signals the calibration coefficients for the array antenna are determined. For example, from each antenna of the array antenna a corresponding radio signal is transmitted using a correspondingly assigned radio resource. For example, the corresponding radio signals are transmitted subsequently in corresponding radio resources. As an example, a first radio signal is transmitted from a first antenna of the array antenna using a first radio resource. Subsequently, a second radio signal is transmitted from a second antenna of the array antenna using a second radio resource. This is continued for each antenna of the array antenna. The radio signals transmitted from each antenna of the array antenna are received at the other antennas of the array antenna, and the calibration coefficients for the array antenna are determined based on the received radio signals.

The calibration coefficients may compensate for a temporal drift of hardware circuitry of the array antenna.

The calibration coefficients may be indicative of a transmit gain, a transmit phase shift, a receive gain, and/or a receive phase shift for each antenna of the array antenna.

According to further examples, calibrating of the array antenna is repeatedly triggered in accordance with a timing schedule. The timing schedule may be provided at the base station or the terminal. The timing schedule may comprise a manufacturer predefined timing schedule, or may be determined based on conditions in the communication system or the terminal, for example based on a degraded performance of uplink and/or downlink communications.

According to further examples, performing of the over-the-air measurements comprises sounding a direct channel associated with the mutual coupling between the antennas of the array antenna. As described above, from each antenna of the array antenna a corresponding radio signal may be transmitted which may be directly received over the air at the remaining antennas of the array antenna. The radio signal may comprise a known pilot or sounding signal such that quality measurements of the received radio signal may be obtained for calibrating coefficients of the antennas of the array antenna.

According to an example, the method may be included in a beam sweep procedure. In particular, the array antenna of the terminal may be controlled to perform a plurality of receive beam sweeps. Each receive beam sweep is associated with a downlink pilot transmission on an associated transmit beam of the base station. From the plurality of receive beam sweeps, a selected beam is selected based on a comparison of receive qualities of the downlink pilot transmissions. Next, as described above, calibration coefficients of the antennas of the array antenna of the terminal may be determined based on the over-the-air measurements of mutual coupling between antennas of the array antenna using the radio resources provided by the base station. Based on the calibration coefficients, an uplink transmission and/or a downlink transmission using the selected beam is performed. The uplink and/or downlink transmissions may comprise for example payload data transmissions or control data transmissions of the MIMO communication system.

Calibrating the array antenna of the terminal may be initiated or triggered based on one or more of the following:

According to an example, a receive quality of the uplink transmission maybe determined, and calibrating of the array antenna may be triggered based on the receive quality of the uplink transmission. For example, the receive quality of the uplink transmission may be compared to a threshold value, and calibrating the array antenna may be triggered upon crossing the threshold value. The receive quality may comprise for example a signal-to-noise ratio or a bit rate error rate or frame rate error rate.

Additionally or as an alternative, a receive quality of the downlink transmission maybe determined, and calibrating of the array antenna may be triggered based on the receive quality of the downlink transmission. For example, the receive quality of the downlink transmission may be compared to a threshold value, and calibrating the array antenna may be triggered upon crossing the threshold value. The receive quality may comprise for example a signal-to-noise ratio or a bit rate error rate or frame rate error rate.

According to another example, a receive quality of the uplink transmission and a receive quality of the downlink transmission may be determined. Further, a difference between the receive quality of the uplink transmission and the receive quality of the downlink transmission may be determined. Calibrating of the array antenna may be triggered based on a change in determined difference or based on a change of a ratio of the receive quality of the uplink transmission to the receive quality of the downlink transmission. In particular, in case the receive quality of the downlink transmission differs from the receive quality of the uplink transmission, this effect may be based on degraded beam coherence instead of a general degradation of the radio channel between the base station and the terminal. Therefore, a recalibration in this case may be appropriate.

Furthermore, according to the present invention, a terminal for a MIMO communication system is provided. The terminal comprises an array antenna and a processing unit. The processing unit is configured to transmit, to a base station of the MIMO communication system, a calibration capability indication indicative of a capability of the terminal of calibrating receivers and transmitters for beam correspondence. The processing unit is further configured to receive, from the base station of the MIMO communication system, a control message which indicates radio resources to be used by the terminal for calibrating its receivers and transmitters for beam correspondence. The processing unit is furthermore configured to use the radio resources for calibrating receivers and transmitters of the terminal for beam correspondence by performing over-the-air measurements of mutual coupling between antennas of the array antenna. The terminal may be configured to perform the above-described methods.

Further, according to the present invention, a base station for a MIMO communication system is provided. The base station comprises an array antenna and a processing unit configured to receive, from a terminal of the MIMO communication system, a calibration capability indication indicative of a capability of the terminal of calibrating receivers and transmitters for beam correspondence, and to transmit, to the terminal of the MIMO communication system, a control message indicative of radio resources. The radio resources are to be used by the terminal for calibrating receivers and transmitters of the terminal for beam correspondence by performing over-the-air measurements of mutual coupling between antennas of an array antenna of the terminal. The base station may be configured to perform the above-described methods.

The base station may be configured to refrain from transmitting using the radio resources and preventing other terminals from transmitting using the radio resources.

Finally, according to the present invention, a communication system, in particular a MIMO communication system, is provided comprising at least the above described terminal and the above described base station.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
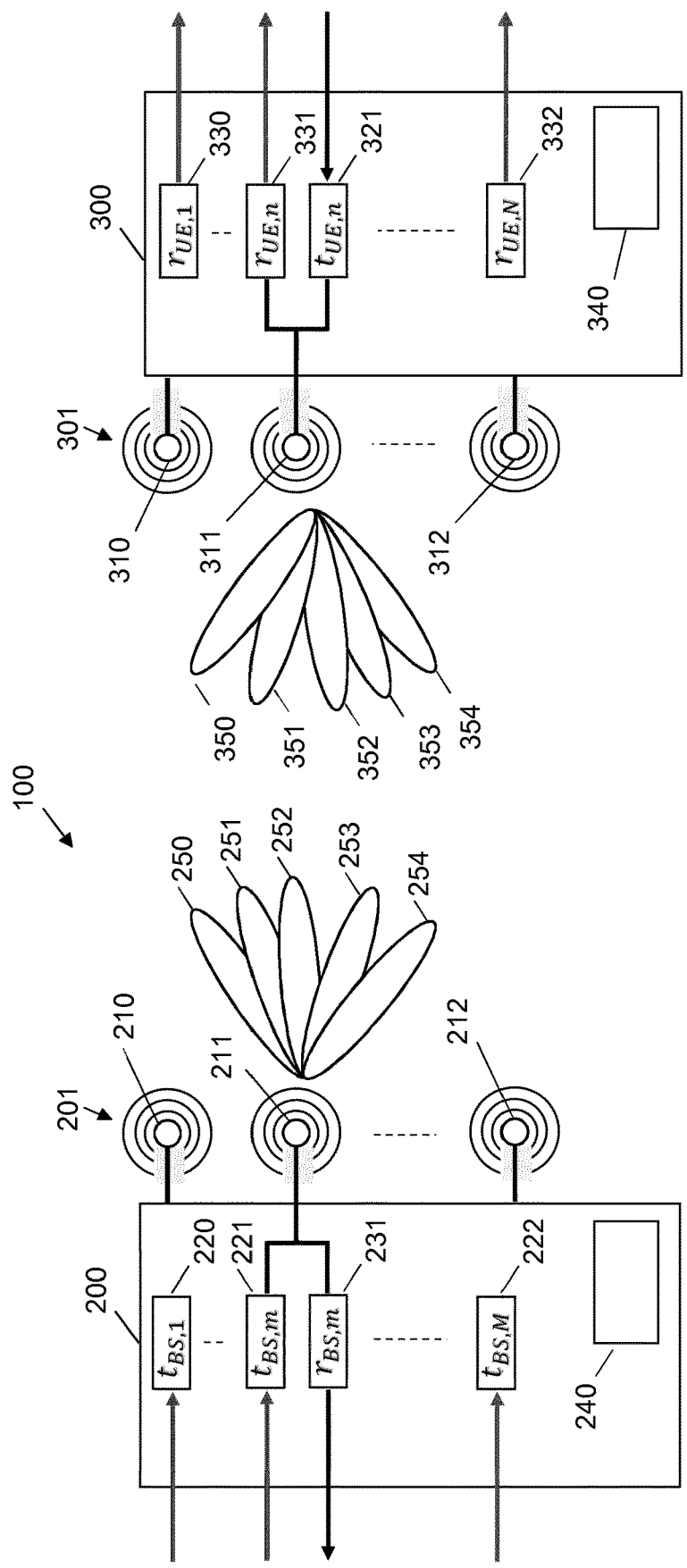
FIG. 1 shows schematically a wireless communication system according to an embodiment of the present invention.

FIG. 1 shows a wireless communication system 100. The wireless communication system 100 includes a base station 200 and a terminal 300. The base station 200 and the terminal 300 may operate according to standardized wireless cellular communication protocols, for example 3GPP LTE for 5G NR. Although FIG. 1 shows only one terminal 300, the wireless communication system 100 may comprise a plurality of terminals communicating with the base station 200. The terminals may comprise mobile phones, mobile and stationary computers, tablet computers, smart wearable devices or smart mobile devices. The wireless communication system 100 may comprise a plurality of base stations serving a plurality of cells of the wireless communication system 100.

The base station 200 may support a so called multiple input and multiple output (MIMO) technology and therefore the base station 200 may have a large number of antennas, for example several tens or in excess of one hundred antennas. Likewise, the terminal 300 may support the MIMO technology and may therefore also have a plurality of antennas, for example 8 to 20 antennas or even in excess thereof.

The base station 200 comprises an array antenna 201 comprising a plurality of antennas. The array antenna 201 of the base station 200 shown in FIG. 1 may comprise for example M antennas, of which only three antennas are shown for clarity reasons and referenced by reference signs 210 to 212. The antennas of the array antenna 201 may be arranged in a two-dimensional or three-dimensional array antenna on a carrier. The base station 200 comprises furthermore associated transmitters and receivers for the antennas 210-212. In particular, to each antenna a pair of a transmitter and a receiver may be assigned. For clarity reasons, in FIG. 1, only transmitter 220 assigned to antenna 210, transmitter 221 assigned to antenna 211, transmitter 222 assigned to antenna 212, and receiver 231 assigned to antenna 211 are shown. Each transmitter may have a transfer function characterizing gain and phase of the transmitter, which may depend on a frequency of a transmitted signal and which may drift over time, or may depend on environmental conditions, for example temperature. Each receiver may have a transfer function characterizing gain and phase of the receiver, which may depend on a frequency of a received signal and which may drift over time, or may depend on environmental conditions, for example temperature. In FIG. 1, transmitter 220 has transfer function $t_{BS,1}$, transmitter 221 has transfer function $t_{BS,m}$, transmitter 222 has transfer function $t_{BS,M}$, and receiver 231 has transfer function $r_{BS,m}$.

The base station 200 comprises furthermore a processing unit 240. The processing unit 240 is coupled to the transmitters and receivers and comprises for example a controller, a computer or a microprocessor. Although in FIG. 1 only one array antenna 201 is shown, the base station 200 may comprise more than one array antenna, for example two, three, four or even more, for example several tens of array antennas, which may cooperate with each other and which may be arranged near to each other or spaced apart.

The array antenna 201 may be configured to transmit radio-frequency signals into specific directions, which are called transmit beams. Five of these beams are shown in FIG. 1 and indicated by reference signs 250 to 254. The configuration of the beams 250 to 254 may be static or dynamic. The transmission of radio-frequency signals into a specific beam direction may be achieved by beamforming technologies as it is known in MIMO technologies. The array antenna 201 may further be configured to receive radio-frequency signals from specific directions which are called receive beams. Depending on the configuration of the receivers and transmitters, the transmit beams may correspond to the receive beams, or the transmit beam may not correspond to the receive beams.

The terminal 300 comprises an array antenna 301 comprising a plurality of antennas. As shown in FIG. 1, the array antenna 301 of the terminal 300 may comprise for example N antennas, of which only three antennas are shown for clarity reasons and referenced by reference signs 310 to 312. The number of antennas N of the array antenna 301 of the terminal 300 may be different from the number M of antennas of the array antenna 201 of the base station 200. In particular, N may be lower than M. The antennas of the array antenna 301 may be arranged in a two-dimensional or three-dimensional antenna array on a carrier. The terminal 300 comprises furthermore associated transmitters and receivers for the antennas 310-312. In particular, to each antenna a pair of a transmitter and a receiver may be assigned. For clarity reasons, in FIG. 1, only receiver 330 assigned to antenna 310, receiver 331 assigned to antenna 311, receiver 332 assigned to antenna 312, and transmitter 321 assigned to antenna 311 are shown. Each transmitter may have a transfer function characterizing gain and phase of the transmitter, which may depend on a frequency of a transmitted signal and which may drift over time, or may depend on environmental conditions, for example temperature. Each receiver may have a transfer function characterizing gain and phase of the receiver, which may depend on a frequency of a received signal and which may drift over time, or may depend on environmental conditions, for example temperature. In FIG. 1, receiver 330 has transfer function $r_{UE,1}$, receiver 331 has transfer function $r_{UE,n}$, receiver 332 has transfer function $r_{UE,N}$, and transmitter 231 has transfer function $t_{UE,n}$.

The terminal 300 comprises furthermore a processing unit 340. The processing unit 340 is coupled to the transmitters and receivers and comprises for example a controller, a computer or a microprocessor.

The array antenna 301 may be configured to receive radio-frequency signals from specific directions, which are called receive beams. Five of these receive beams are shown in FIG. 1 and indicated by reference signs 350 to 354. The configuration of the beams 350 to 354 may be static or dynamic. The reception of radio-frequency signals from a specific beam direction may be achieved by beamforming technologies as it is known in MIMO technologies. The array antenna 301 may further be configured to transmit radio-frequency signals into specific directions which are called transmit beams. Depending on the configuration of the receivers and transmitters, the transmit beams may correspond to the receive beams, or the transmit beam may differ from the receive beams.

Operation of the base station 200 in connection with the terminal 300 using beamforming technologies will be described in the following.

The base station 200 may start performing a beam sweep in the downlink direction, which means that the base station 200 configures its transmitters to transmit radio signals in a first direction, for example along transmit beam 250. The base station 200 may transmit channel sounding radio signals, for example downlink pilot signals, in the direction of transmit beam 250. The terminal 300 performs a receive beam sweep and receives the downlink pilot signals transmitted in transmit beam 250 subsequently with each receive beam 350 to 354.

Next, the base station configures its transmitters to transmit radio signals, for example downlink pilot signals, in a second direction, for example along transmit beam 251. Again, the terminal 300 performs a receive beam sweep and receives the downlink pilot signals transmitted in the transmit beam 251 subsequently with each receive beam 350 to 354. This procedure is subsequently performed for each transmit beam 250 to 254 of the base station 200.

To sum up, the terminal 300 controls the array antenna 301 to perform a plurality of receive beam sweeps, wherein each receive beam sweep is associated with a downlink pilot transmission on an associated transmit beam of the base station 200.

The strongest pair of the base station and terminal beams is selected and reported to the base station 200. Subsequent downlink transmissions may use the reported beam pair.

In particular in time division duplexing (TDD) communication uplink communication from the terminal 300 to the base station 200 may be established assuming reciprocity of the propagation radio channel. However, the radio channel includes hardware of receivers and transmitters of the base station 200 and the terminal 300, which may not provide appropriate reciprocity.

In principle, the channel property $y_{DL}$ in the downlink direction and the channel property $y_{UL}$ in the uplink direction may be defined as:

$$y_{DL} = w_{UE}^T R_{UE} H_{DL} T_{BS} w_{BS}$$

$$y_{UL} = w_{BS}^T R_{BS} H_{DL}^T T_{UE} w_{UE}$$

wherein $H_{DL}$ relates to a downlink propagation channel matrix,
$H_{DL}^T$ relates to a transpose matrix of $H_{DL}$,
$w_{UE}$ relates to a beamforming matrix at the terminal,
$w_{UE}^T$ relates to a transpose matrix of $w_{UE}$,
$w_{BS}$ relates to a beamforming matrix at the base station.
$w_{BS}^T$ relates to a transpose matrix of $w_{BS}$,
$R_{UE}$ relates to an effect of the receive hardware at the terminal (diagonal matrix including $r_{UE,1}$ to $r_{UE,N}$),
$T_{UE}$ relates to an effect of the transmit hardware at the terminal (diagonal matrix including $t_{UE,1}$ to $t_{UE,N}$),
$R_{BS}$ relates to an effect of the receive hardware at the base station (diagonal matrix including $r_{BS,1}$ to $r_{BS,M}$), and
$T_{BS}$ relates to an effect of the transmit hardware at the base station (diagonal matrix including $t_{BS,1}$ to $t_{BS,M}$), For providing an uplink communication having essentially the same quality and performance as the downlink communication, efforts may be made to align the channel property $y_{DL}$ in the downlink direction and the channel property $y_{UL}$ in the uplink direction.

Due to high quality of radio-frequency components in the base station 200 and internal reciprocity calibration of the base station 200, the transfer functions of the receivers and transmitters of the base station 200 may be aligned, for example such that $$r_{BS,m} \approx t_{BS,m} \text{ for } m=1 \ldots M,$$

in particular such that $$r_{BS,m} \approx t_{BS,m} \approx 1 \text{ for } m=1 \ldots M.$$

Under this assumption, the channel property $y_{DL}$ in the downlink direction and the channel property $y_{UL}$ in the uplink direction may be defined as:

$$y_{DL} = w_{UE}^T R_{UE} H_{DL} w_{BS}$$

$$y_{UL} = w_{BS}^T H_{DL}^T T_{UE} w_{UE}$$

For achieving that the optimal beam pair ($w_{BS}$, $w_{UE}$) in the downlink direction is also the optimal beam pair in the uplink direction, it may be required at the terminal 300 that $$r_{UE,n} = t_{UE,n} \text{ for } n=1 \ldots N,$$

such that:

$$y_{DL} = w_{UE}^T R_{UE} H_{DL} w_{BS}$$

$$y_{UL} = w_{BS}^T H_{DL}^T R_{UE} w_{UE} = y_{DL}$$

which is called "full beam correspondence" at the terminal 300. The full beam correspondence may be defined as a condition where the degradation in signal-to-noise ratio (SNR) between the optimal uplink beam pair and the beam pair selected for the downlink is less than 0.5 dB.

As full beam correspondence may be difficult to achieve, a nearly optimal alignment of the uplink beam pair and the downlink beam pair may be achieved by $$r_{UE,n} \approx t_{UE,n} \text{ for n=1 } \ldots \text{ N},$$

such that:

$$y_{DL} = w_{UE}^T R_{UE} H_{DL} w_{BS}$$

$$y_{UL} \approx w_{BS}^T H_{DL}^T R_{UE} w_{UE} \approx y_{DL}$$

which is called "partial beam correspondence" at the terminal 300. The partial beam correspondence may be defined as a condition where the degradation in signal-to-noise ratio (SNR) between the optimal uplink beam pair and the beam pair selected for the downlink is less than 2 dB.

Partial or full beam correspondence at the terminal 300 may be achieved by offline measurement methods, for example in a laboratory of the manufacturer, for the terminal 300 and corresponding calibration of the receive and transmit hardware of the terminal 300. However, appropriate beam correspondence of calibration may be difficult to achieve due to changing environmental conditions like temperature and humidity changes, drift of hardware components, and further the beam correspondence may depend on a frequency band of operation.

Figure 2:
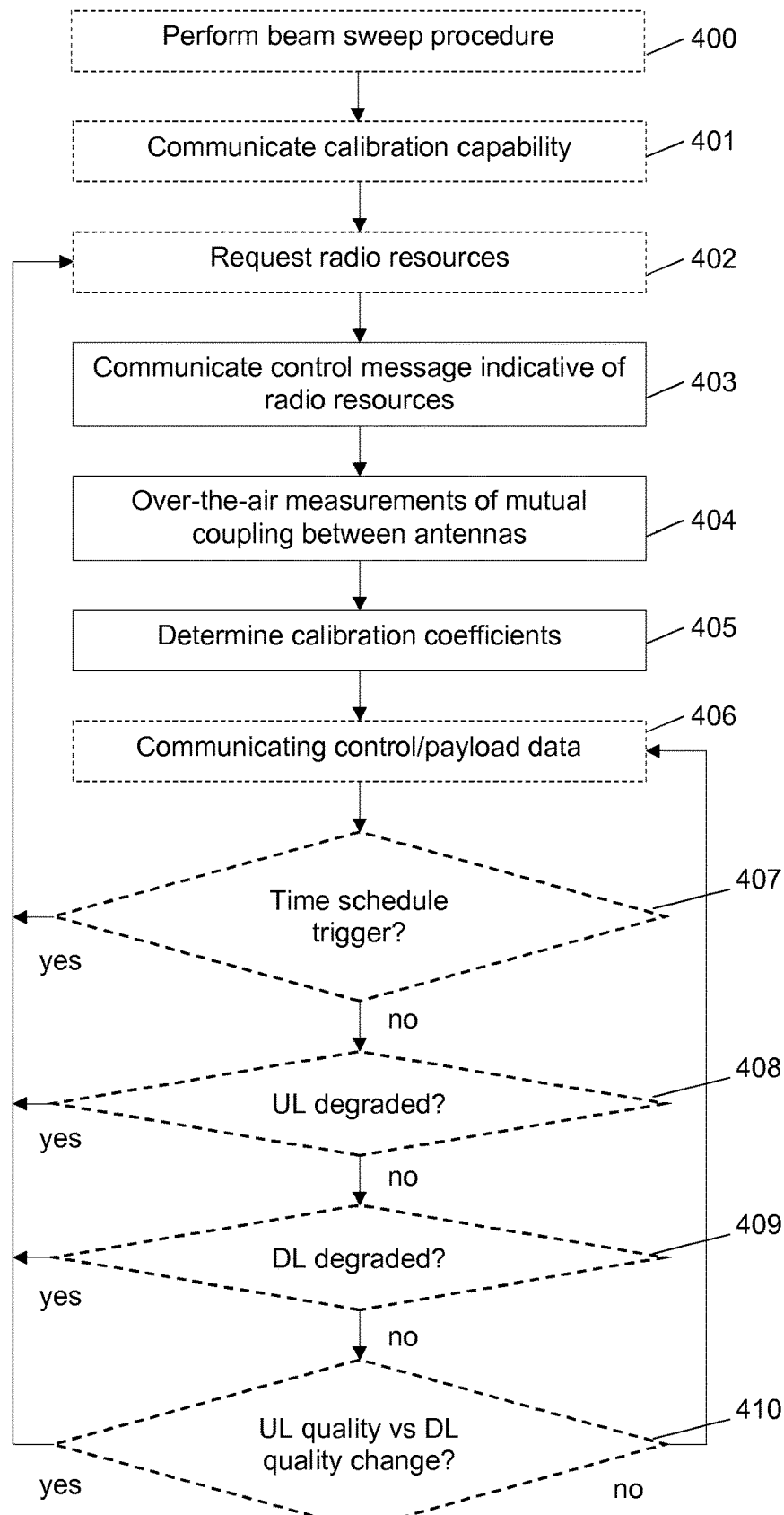
FIG. 2 shows a flowchart comprising method steps according to an embodiment of the present invention.

Therefore, an online calibration of the beam correspondence (BC) at the terminal 300 may be performed as will be described in the following. FIG. 2 shows method steps for the performing the online BC calibration. The steps in the dashed boxes are optional steps.

In step 400, the above-described beam sweep procedure between the base station 200 and the terminal 300 may be performed such that an optimised downlink beam pair is determined.

In step 401 the terminal 300 may communicate to the base station 200 a calibration capability indication which indicates a capability of the terminal 300 of calibrating receivers and transmitters for beam correspondence (BC). Based on the calibration capability indication, the base station 200 may reserve radio resources which may be used by the terminal 300 for BC calibration. Upon receiving the calibration capability indication, the base station 200 may transmit in step 403 a control message to the terminal 300 which indicates the radio resources to be used by the terminal 300 for the BC calibration. As an alternative, the terminal 300 may request in step 402 radio resources for BC calibration, and the base station 200 may communicate in step 403 the control message to the terminal 300 which indicates the requested radio resources for the BC calibration. In the calibration capability indication (of step 401) and/or the request (of step 402) the terminal 300 may indicate the number of required radio resources. The number of required radio resources may correspond for example to the number of ports or antennas of the terminal 300. The radio resources may comprise time/frequency resources defined in the communication system 100, in particular in band radio resources assigned to a communication between the base station 200 and the terminal 300 in the MIMO communication system 100. The radio resources may comprise radio resources which are spread out over a frequency band assigned to communications between the base station 200 and the terminal 300 as well other terminals in the MIMO communication system 100. The radio resources may be selected based on a coherence bandwidth of the hardware circuitry of the array antenna 301, in particular such that a bandwidth for the transmit beam is covered. The base station 200 may be configured to refrain from transmissions using the radio resources and preventing other terminals in the communication system 100 from transmissions using the radio resources. Thus, the radio resources may be exclusively used by the terminal 300 for the BC calibration. The radio resources may be reserved radio resources.

In step 404 the terminal 300 uses the radio resources received from the base station 200 for performing over-the-air measurements of mutual couplings between antennas of the array antenna 301. Performing over-the-air measurements will be described in more detail in connection with FIGS. 3 and 4.

Figure 3:
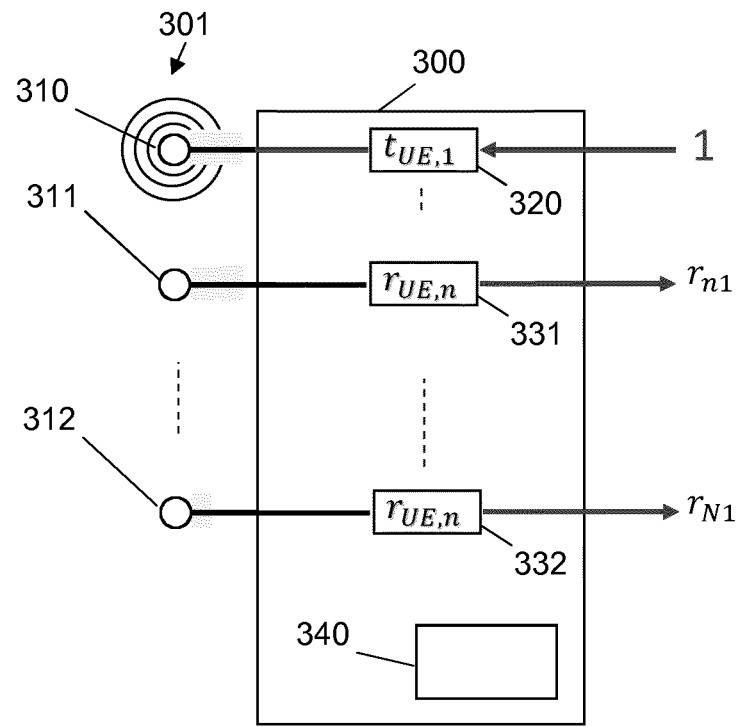
FIG. 3 schematically shows performing over-the-measurements of mutual coupling between antennas according to an embodiment of the present invention.
Figure 4:
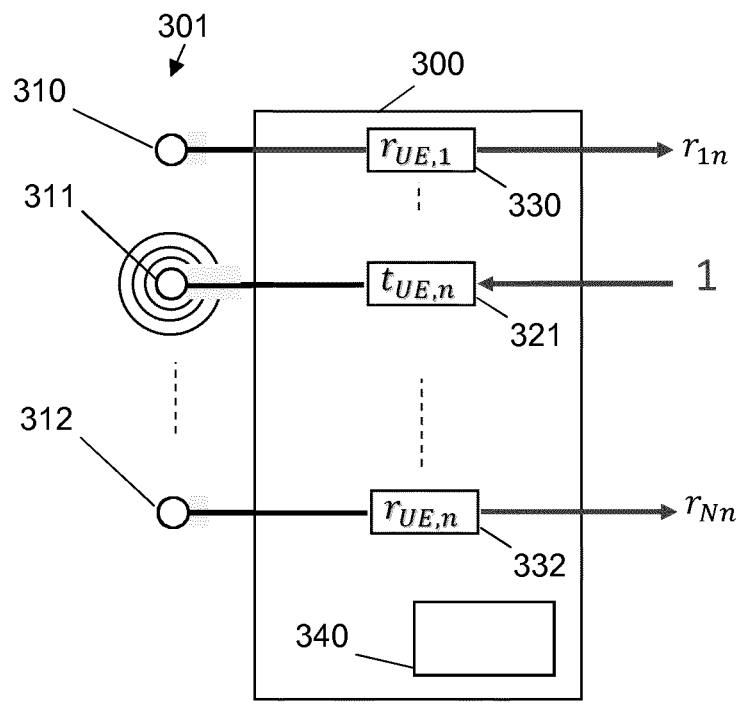
FIG. 4 schematically shows performing over-the-measurements of mutual coupling between antennas according to a further embodiment of the present invention.

Subsequently for each antenna 310 to 312 of the array antenna 301 a radio signal is transmitted using the radio resources. The radio signal is received at at least some other antennas of the plurality of antennas of the array antenna 301. For example, as shown in FIG. 3, a radio signal is transmitted via antenna 310 using a first radio resource of the radio resources provided by the base station 200. This radio signal is received at the other antennas 311 to 312 of the array antenna 301. Subsequently, as shown in FIG. 4, a radio signal is transmitted via antenna 311 using a second radio resource of the radio resources provided by the base station 200. This radio signal is received at the other antennas 310 and 312 of the array antenna 301. This procedure is subsequently performed for each antenna of the array antenna 301 using subsequently the radio resources provided by the base station 200. Performing of the over-the-air measurements thus comprises sounding a direct channel associated with the mutual coupling between the antennas 310 to 312 of the array antenna 301.

In step 405, based on the received radio signals of the over-the-air measurements, calibration coefficients for the array antenna 301 are determined. The calibration coefficients may indicate for each transmitter of the terminal 300 a corresponding transmit gain and transmit phase shift. Additionally, the calibration coefficients may indicate for each receiver 330 to 332 of the terminal 300 a corresponding receive gain and receive phase shift. For example, with the received signals $\{r_{kl}\}$ with $k \neq l$ a calibration coefficient matrix C may be determined as for example described in "Reciprocity calibration for massive MIMO: Proposal, modeling, and validation" of Vieira, J., Rusek, F., Edfors, O., Malkowsky, S., Liu, L., and Tufvesson, F. (2017) in IEEE Transactions on Wireless Communications, 16(5), 3042-3056. The calibration coefficients may compensate for a temporal drift of hardware circuitry of the array antenna 301 and the associated receivers and transmitters.

Figure 5:
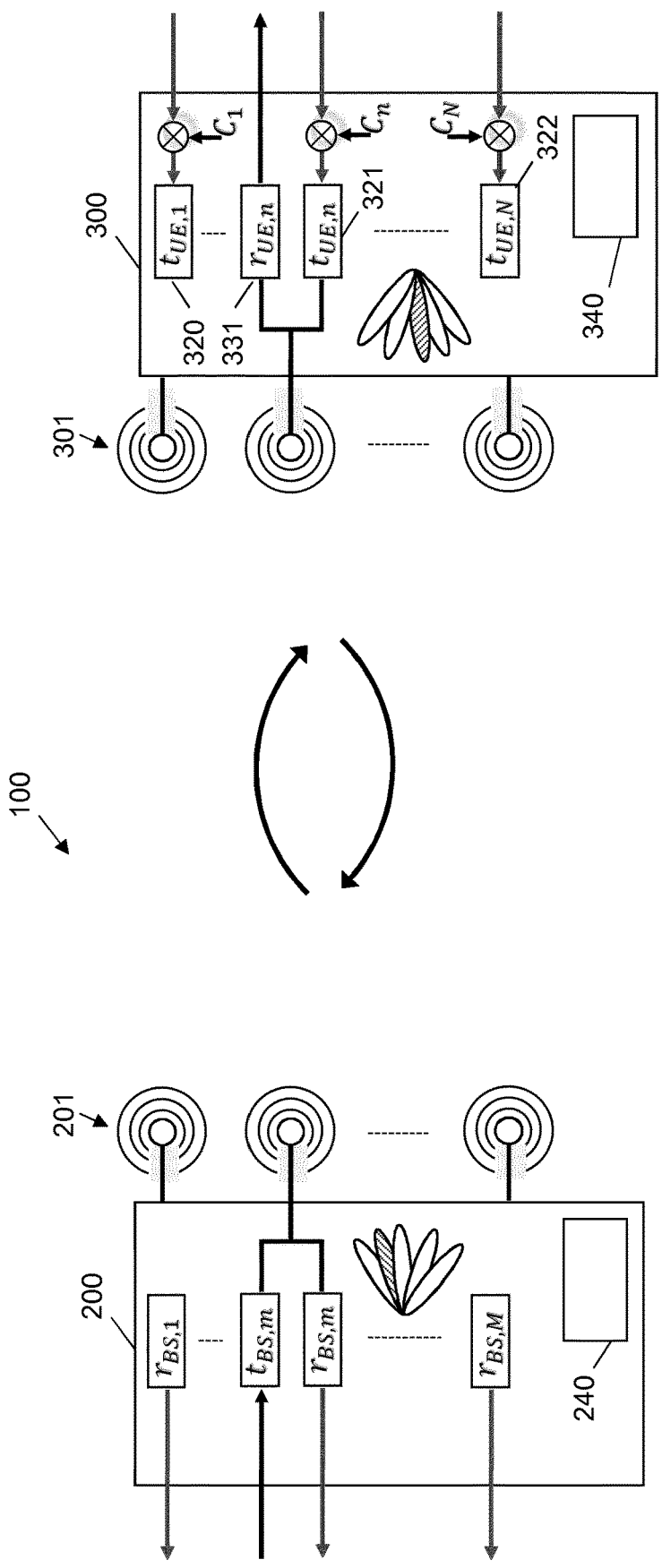
FIG. 5 schematically shows downlink and uplink communications using calibration coefficients according to embodiments of the present invention.

The calibration coefficients may be applied to the signals transmitted via the transmitters of the terminal 300. FIG. 5 shows an example of applying the calibration coefficients $C_1$ to $C_N$ of calibration coefficient matrix C to the signals transmitted by the transmitters 320 to 322 of the terminal 300. In step 406, based on the calibration coefficients, uplink transmissions, for example control data or payload data, using the selected beam pair may be communicated.

A recalibration may be needed due to a temporal drift of hardware components or changes in environmental conditions like temperature and humidity. Several triggers may be utilized for initiating BC recalibration.

For example, BC calibration may be repeatedly triggered in accordance with a timing schedule. For example, in the step 407, a time duration from the previous BC calibration may be monitored and upon expiration of a predefined time interval, BC calibration may be initiated by requesting radio resources in step 402 or by receiving a control message indicative of radio resources in step 403. Additionally or as an alternative, a coherence time of the hardware circuitry of the array antenna 301 of the terminal 300 may be considered for repeatedly triggering BC calibration of the array antenna 301.

Furthermore, for example the base station 200, may monitor the quality or performance of the uplink transmissions (step 408). In case degraded uplink transmissions are detected, the base station may trigger BC calibration, for example by transmitting a control message indicative of radio resources for BC calibration in step 403 or by informing the terminal 300 about the degraded uplink transmissions such that the terminal 300 may request radio resources for BC calibration in step 402.

Furthermore, for example the terminal 300 may monitor the quality or performance of the downlink transmissions (step 409). In case degraded downlink transmissions are detected, the terminal 300 may request radio resources for BC calibration in step 402.

As indicated in step 410, a receive quality of uplink transmissions and a receive quality of downlink transmissions may be determined, and the difference or a ratio between the receive quality of the uplink transmissions and the receive quality of the downlink transmissions may be determined. Based on the determined difference or ratio, BC calibration may be triggered in steps 402 or 403. A change in the difference or ratio of uplink and downlink quality may be a typical symptom of degraded beam correspondence. Therefore, BC recalibration may be triggered upon detecting a change in the difference or the ratio between uplink and downlink quality.

When re-triggering the BC calibration based on uplink and/or downlink quality monitoring, the re-triggering may be performed only if the degraded state is monitored for a predefined number of consecutive transmissions such that burst disturbances do not trigger unnecessary BC calibration.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, according to an exemplary modification, communicating the calibration capability indication from the terminal to the base station of the MIMIO communication system may be omitted. Consequently, a method for calibrating an array antenna of a terminal in a multiple input multiple output (MIMO) communication system comprises communicating, from a base station of the MIMO communication system to the terminal, a control message indicative of radio resources. The control message is indicative of radio resources to be used by the terminal for calibrating its receivers and transmitters for beam correspondence. Using the radio resources, receivers and transmitters of the terminal are calibrated for beam correspondence by performing over-the-air measurements of mutual coupling between antennas of the array antenna.

For illustration, various examples have been described in which the over-the-air measurements are performed using TDD. Alternatively or additionally, it would also be possible that the measurements are performed using FDD.

The invention claimed is:

1. A method for calibrating an array antenna of a terminal in a multiple input and multiple output (MIMO) communication system, the method comprising:
communicating a calibration capability indication from the terminal to a base station indicative of a capability of the terminal of calibrating receivers and transmitters for beam correspondence,
communicating, from a base station of the MIMO communication system to the terminal, a control message indicative of radio resources to be used by the terminal for calibrating receivers and transmitters of the terminal for beam correspondence, and
using the radio resources for calibrating receivers and transmitters of the terminal for beam correspondence by performing over-the-air measurements of mutual coupling between a plurality of antennas of the array antenna.

2. The method of claim 1, wherein calibrating receivers and transmitters of the terminal for beam correspondence comprises:
determining calibration coefficients ($C_1$-$C_N$) of the antennas of the array antenna of the terminal based on the over-the-air measurements.

3. The method of claim 1, wherein the radio resources comprise radio resources spread out over a frequency band assigned to communications between the base station and terminals in the MIMO communication system.

4. The method of claim 1, wherein the radio resources comprise in-band radio resources assigned to a communication between the base station and the terminal in the MIMO communication system.

5. The method of claim 1, wherein the radio resources are selected based on a coherence bandwidth of hardware circuitry of the array antenna.

6. The method of claim 1,
wherein the control message indicative of radio resources is associated with the calibration capability indication.

7. The method of claim 6, wherein the calibration capability indication is indicative of a number of resources required by the terminal for performing the over-the-air measurements.

8. The method of claim 1, further comprising:
communicating a calibration request indication from the terminal to the base station requesting the radio resources.

9. The method of claim 1, further comprising:
communicating a calibration request indication from the base station to the terminal for triggering the calibrating of the array antenna of the terminal.

10. The method of claim 1, further comprising:
repeatedly triggering said calibrating of the array antenna in accordance with a coherence time of hardware circuitry of the array antenna.

11. The method of claim 1, wherein performing the over-the-air measurements comprises:
performing subsequently for each antenna of the plurality of antennas of the array antenna operations comprising:
transmitting a radio signal via the antenna using the radio resources,
receiving the radio signal by at least some antennas of the plurality of antennas, and determining calibration coefficients ($C_1$-$C_N$) for the array antenna based on the radio signal that was received.

12. The method of claim 2, wherein the calibration coefficients ($C_1$-$C_N$) compensate for a temporal drift of hardware circuitry of the array antenna.

13. The method of claim 1, further comprising:
repeatedly triggering said calibrating of the array antenna in accordance with a timing schedule.

14. The method of claim 1, wherein said performing of the over-the-air measurements comprises sounding a direct channel associated with the mutual coupling between antennas of the array antenna.

15. The method of claim 1, further comprising:
controlling the array antenna to perform a plurality of receive beam sweeps, wherein ones of the receive beam sweeps are associated with respective downlink pilot transmissions on associated transmit beams of the base station,
selecting, from the plurality of receive beam sweeps, a selected beam based on a comparison of receive qualities of the downlink pilot transmissions,
based on the calibrating, performing at least one of an uplink transmission or a downlink transmission using the selected beam.

16. The method of claim 1, further comprising:
triggering said calibrating of the array antenna based on at least one of a uplink transmission, a downlink transmission, or a change in difference between receive quality of the uplink transmission and the downlink transmission.

17. The method of claim 2, wherein the calibration coefficients ($C_1$-$C_N$) are indicative of at least one of a transmit gain, a transmit phase shift, a receive gain, or a receive phase shift for each antenna of the array antenna.

18. A terminal for a multiple input and multiple output (MIMO) communication system, the terminal comprising:
an array antenna, and
a processing unit configured to perform operations comprising:
transmitting, to a base station of the MIMO communication system, a calibration capability indication indicative of a capability of the terminal of calibrating receivers and transmitters for beam correspondence,
receiving, from the base station of the MIMO communication system, a control message indicative of radio resources to be used by the terminal for calibrating receivers and transmitters of the terminal for beam correspondence,
using the radio resources for calibrating receivers and transmitters of the terminal for beam correspondence by performing over-the-air measurements of mutual coupling between antennas of the array antenna.

19. A method of operating a base station in a multiple input and multiple output (MIMO) communication system, the method comprising:
receiving, from a terminal of the MIMO communication system, a calibration capability indication indicative of a capability of the terminal of calibrating receivers and transmitters for beam correspondence,
transmitting, to the terminal of the MIMO communication system, a control message indicative of radio resources, wherein the radio resources are used by the terminal for calibrating receivers and transmitters of the terminal for beam correspondence by performing over-the-air measurements of mutual coupling between antennas of an array antenna of the terminal.

20. The method of claim 19, further comprising:
refraining from transmitting using the radio resources and preventing other terminals from transmitting using the radio resources.

21. A base station for a multiple input and multiple output (MIMO) communication system, the base station comprising:
an array antenna, and
a processing unit configured to perform operations comprising:
receiving, from a terminal of the MIMO communication system, a calibration capability indication indicative of a capability of the terminal of calibrating receivers and transmitters for beam correspondence, and
transmitting, to the terminal of the MIMO communication system, a control message indicative of radio resources, wherein the radio resources are used by the terminal for calibrating receivers and transmitters of the terminal for beam correspondence by performing over-the-air measurements of mutual coupling between antennas of an array antenna of the terminal.

* * * * *